(12) United States Patent
Imagawa et al.

(10) Patent No.: US 7,783,084 B2
(45) Date of Patent: Aug. 24, 2010

(54) FACE DECISION DEVICE

(75) Inventors: Kazuyuki Imagawa, Toyonaka (JP); Eiji Fukumiya, Toyonaka (JP); Yasunori Ishii, Ibaraki (JP); Katsuhiro Iwasa, Kadoma (JP)

(73) Assignee: Panasonic Corporation, Osaka (JP)

( * ) Notice: Subject to any disclaimer, the term of this patent is extended or adjusted under 35 U.S.C. 154(b) by 903 days.

(21) Appl. No.: 11/333,286

(22) Filed: Jan. 18, 2006

(65) Prior Publication Data

US 2006/0177110 A1 Aug. 10, 2006

(30) Foreign Application Priority Data

Jan. 20, 2005 (JP) ............................ 2005-012514
Jan. 10, 2006 (JP) ............................ 2006-003019

(51) Int. Cl.
*G06K 9/00* (2006.01)
*G06K 9/62* (2006.01)
*G06K 9/46* (2006.01)

(52) U.S. Cl. ..................... 382/118; 382/155; 382/203; 382/103

(58) Field of Classification Search ............... 382/118, 382/155, 203, 103
See application file for complete search history.

(56) References Cited

U.S. PATENT DOCUMENTS

| | | | |
|---|---|---|---|
| 6,184,926 B1 * | 2/2001 | Khosravi et al. ............ 348/239 |
| 0,159,627 A1 | 10/2002 | Schneiderman et al. | |
| 6,697,502 B2 * | 2/2004 | Luo ........................... 382/115 |
| 6,700,999 B1 * | 3/2004 | Yang .......................... 382/118 |
| 6,766,035 B1 * | 7/2004 | Gutta ......................... 382/103 |
| 7,050,607 B2 * | 5/2006 | Li et al. ..................... 382/118 |
| 7,057,636 B1 * | 6/2006 | Cohen-Solal et al. ..... 348/14.08 |
| 7,274,832 B2 * | 9/2007 | Nicponski .................. 382/297 |
| 7,308,119 B2 * | 12/2007 | Gohda et al. ............... 382/118 |
| 7,349,558 B2 * | 3/2008 | Enomoto .................... 382/118 |
| 7,433,518 B2 * | 10/2008 | Shiratani ................... 382/190 |
| 7,453,506 B2 * | 11/2008 | Li .............................. 348/333.12 |
| 7,590,284 B2 * | 9/2009 | Kakiuchi et al. ........... 382/167 |
| 7,593,585 B2 * | 9/2009 | Ishida ........................ 382/254 |
| 2001/0026633 A1 * | 10/2001 | Abdel-Mottaleb et al. .. 382/118 |
| 2002/0081026 A1 * | 6/2002 | Izume et al. ................ 382/170 |
| 2002/0118287 A1 * | 8/2002 | Grosvenor et al. ........ 348/222.1 |
| 2002/0159627 A1 * | 10/2002 | Schneiderman et al. .... 382/154 |
| 2002/0181784 A1 * | 12/2002 | Shiratani ................... 382/218 |
| 2003/0103647 A1 * | 6/2003 | Rui et al. .................... 382/103 |
| 2005/0129326 A1 * | 6/2005 | Matama ...................... 382/254 |
| 2005/0129331 A1 * | 6/2005 | Kakiuchi et al. ........... 382/275 |
| 2005/0147302 A1 * | 7/2005 | Leung ........................ 382/190 |
| 2005/0238209 A1 * | 10/2005 | Ikeda et al. ................. 382/118 |
| 2005/0271295 A1 * | 12/2005 | Tabata et al. ................ 382/274 |

(Continued)

FOREIGN PATENT DOCUMENTS

JP  2001-357404  12/2001

*Primary Examiner*—Bhavesh M Mehta
*Assistant Examiner*—Kathleen S Yuan
(74) *Attorney, Agent, or Firm*—Wenderoth, Lind & Ponack, L.L.P.

(57) ABSTRACT

A face detection device comprises: a judgment area determining operable to judgment areas in an inputted image; and a face judgment unit operable to judge existence of a face image greater than a first predetermined size in the judgment areas. According to face directions, the judgment area determining unit determines a ratio of the inputted image to the judgment areas. The characteristics of face images can be effectively utilized.

26 Claims, 12 Drawing Sheets

U.S. PATENT DOCUMENTS

2006/0062435 A1* 3/2006 Yonaha ..................... 382/118
2006/0088207 A1* 4/2006 Schneiderman ............ 382/159
2006/0133654 A1* 6/2006 Nakanishi et al. ........... 382/118

* cited by examiner

Fig. 5
| window size | direction A | direction B | direction C |
|---|---|---|---|
| 10 | ✓ | | |
| 20 | ✓ | | |
| 30 | ✓ | ✓ | |
| 40 | ✓ | ✓ | |
| 50 | ✓ | ✓ | ✓ |
| ... | | | |
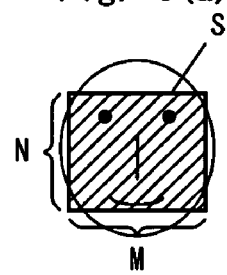
Fig. 6(a)
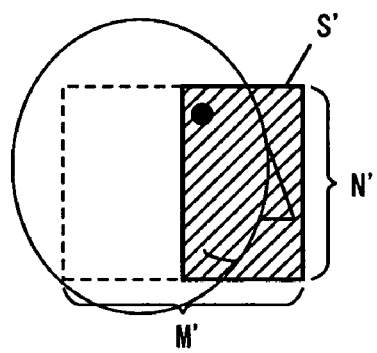
Fig. 6(b)

| turn angle | profile (left) | frontal | profile (right) |
|---|---|---|---|
| -60 | ✓ |  | ✓ |
| -30 | ✓ | ✓ | ✓ |
| 0 | ✓ | ✓ | ✓ |
| 30 | ✓ | ✓ | ✓ |
| 60 | ✓ |  | ✓ |

| aspect ratio | direction A | direction B | direction C |
|---|---|---|---|
| 1:1.25 | | ✓ | |
| 1:1.1 | | ✓ | |
| 1:1 | ✓ | ✓ | ✓ |

FACE DECISION DEVICE

BACKGROUND OF THE INVENTION

1. Field of the Invention

The present invention relates to a face detection device that detects the position and the size of one or more face images included in an image.

2. Description of the Related Art

In recent years, not only digital cameras but also recording media having large capacity (e.g. hard disk drives) are widely used. The amount of movies, each of which is a set of still images, and/or still images recorded thereon by a person has become huge.

Mobile devices associated with cameras (e.g. personal digital assistants and cell phones) are also widely used, and many persons use the devices to send e-mails to which one or more image files are attached. The persons detect person images from a group of images photographed by the devices to attach the one or more detected images to the e-mails. Thereby, the persons often satisfy their identity, and add their feelings and/or emotion to the e-mails.

This situation requires technology for searching, detecting, tagging and recommending only one or more desired face images among the huge amount of still images. Herein, a "desired" image is a face image that suits some purposes, which may be an image that can specify a specific person, a well-taken face image that can be attached to the e-mails, or a face image that is good to be edited.

The composition of the images is various, which may be not only the snapshot composition of an upper half of the body used for personal ID cards, but also that of a profile face, or that of a set of small face images in souvenir photographs. Each of frame images constituting the movies is the same as above.

With respect to the content of the images, needless to say, a case where no person image is included (e.g. a landscape image), in some cases, a person image may be intentionally considered as not an image of a photographic subject but an image of a part of landscape. This assumption requires dealing with face directions and face rotation.

Document 1 (U.S. patent publication No. 2002/0159627) discloses face detection technology that deals with various directions. A judgment unit that judges whether one or more face images exist in a partial rectangle area of an image is provided. When an area where one or more face images exist therein should be detected, the judgment unit repeats the processes of defining the partial rectangle area; and raster-scanning the defined partial rectangle area from a corner of the image, thereby judging whether one or more face images exist in the defined partial rectangle area. The partial rectangle area size is defined based on the size of a face image to be judged.

In general, various size face images (from a big face image to a small face image) may exist in the image. Accordingly, it is required to repeat judging whether or not the partial rectangle area is an area including one or more face images, while changing the size of the partial rectangle area from a small size to a big size.

The face judgment unit scales the partial rectangle area into a predetermined size, and judges whether the area includes a face image. The face judgment unit, beforehand, has already learned a group of face images in various directions (e.g. frontal face, profile, and so on.) utilizing a statistical learning means (e.g. neural network), which performs face judgment utilizing the learning result.

To be more specific, a learning result concerning frontal face images and a learning result concerning profile face images have been separately stored. The face judgment unit performs face judgment utilizing these learning results.

Document 2 (Published Japanese Patent Application Laid-Open No. 2001-357404) discloses a method for detecting a desired image from an image database. A direction of a photographic subject in an image of the image database is detected, and then an image including the photographic subject looking toward a predetermined direction is detected from the image database based on a result of the detection.

However, according to document 1, a rate of judging areas including no face image as face areas (in other words, an false positive rate) is high. In particular, in the case of a profile image (when one of two eyes may not be included therein), the false positive rate becomes higher than that of a frontal face image.

Once false positive occurs, a landscape image may be detected when the desired image should be detected from the image database, and this function may become useless and unreliable. In order to reduce false positive, it is also considered to raise the criterion of judgment (e.g. threshold) for judging whether one or more face images exist. This, however, causes judging that an image includes no face image when the image should be judged to include one or more face images.

As described above, since the false positive rate of the profile image is higher than that of frontal face image, raising a threshold for the profile image to reduce false positive causes failing to correctly judge one or more images that should be judged to include a face image, thereby spoiling the original function of face image-detecting.

In document 2, a predetermined direction has been defined, and then it is judged whether or not an inputted image relates to the predetermined direction. Afterward, an image relating to the predetermined direction is detected. The predetermined direction, however, is only one. Since a face may practically look toward various directions, it is hard to say that this method is suitable. Furthermore, according to document 2, since the false positive rate of the profile image is high, and incorrect direction may often be detected, which is inadequate.

OBJECTS AND SUMMARY OF THE INVENTION

In view of the above, an object of the present invention is to provide a face detection device that can detect one or more well-taken face images from a huge amount of stored AV (audio/visual) contents.

A first aspect of present the invention provides a face detection device comprising: a judgment area determining unit operable to determine, in an inputted image, a first judgment area for judging existence of a face image in a front view direction and a second judgment area for judging existence of a face image, the face image to be judged in the second judgment area facing one of predetermined directions different from the front view direction; and a face judgment unit operable to judge existence of a face image in the first judgment area, the face image having a size greater than a first predetermined size, and to judge existence of a face image in the second judgment area, the face image having a size greater than a second predetermined size, as defined correspondingly to the second judgment area, wherein the judgment area determining unit determines a ratio of the first judgment area to the inputted image and a ratio of the second judgment area to the inputted image, according to respective directions of the front view direction and the predetermined directions.

With this structure, the size of the face image can be adequately selected according to the face direction thereof, the detect-ability ratio, thereby, can be improved in comparison with the conventional technology.

A second aspect of the present invention provides a face detection device as defined in the first aspect of the present invention, wherein the first judgment area is the smallest in a group of the first judgment area and the second judgment area.

With this structure, the size of a face image that is easily misjudged (e.g. a profile face image) can be set up greater than that of a frontal face image. Thereby, the detect-ability ratio of the profile face images can be improved. Furthermore, the size of the frontal face image, which is relatively hard to be misjudged, can be set up smaller than that of the profile image, thereby failing to detect one or more small frontal face images can be reduced. Thus, the false positive rate can be reduced in comparison with the conventional technology.

A third aspect of present invention provides a face detection device as defined in the first aspect of the present invention, wherein the judgment area determining unit determines, according to the front view direction, a first rotation range of the first judgment area with respect to the inputted image, and rotates the first judgment area within the determined first rotation range, and wherein the judgment area determining unit determines, according to each of the predetermined directions, a second rotation range for the second judgment area with respect to the inputted image, and rotates the corresponding one of the second judgment area within the determined second rotation range.

With this structure, the rotation degree of a face can be appropriately adjusted in accordance with face directions, and the detect-ability factor can be improved in comparison with the conventional technology.

A fourth aspect of present invention provides a face detection device as defined in the third aspect of the present invention, wherein the determined first rotation range is the smallest range in a group of the first the judgment area and the second rotation areas.

Hereinafter, it is assumed as follows: z-axis is the optical-axis of a camera; u-axis is a horizontal axis of an image photographed by the camera, which is orthogonal to the z-axis; and v-axis is a vertical axis of the image, which is orthogonal to both of the z-axis and the u-axis. In a pseudo plane composed of images of face parts (eyes, a nose, and a mouth), a face direction is a direction of the normal of the pseudo plane.

Rotation 1 (in the image plane): When a face direction is a front direction (frontal face image; the normal of the pseudo plane is parallel to the z-axis.) and a person rotates his/her face centering a joint of his/her head and his/her neck, the frontal face image turns right and left on the z-axis.

Rotation 2 (in the image plane): When a face direction is a left or right direction (profile face image; the normal of the pseudo plane intersects the z-axis.) and a person bends/unbends his/her neck to shake his/her face in the up-and-down direction, the profile (left or right) face image turns on the z-axis. Because of human frame structure, the range of Rotation 2 is wider than the range of Rotation 1.

By adopting the above structure, it is enable to determine the range of Rotation 2 is wider than the range of Rotation 1, therefore, judgment precision and the detect-ability factor each concerning profile face images can be improved.

A fifth aspect of the present invention provides a face detection device as defined in the first aspect of the present invention, wherein the judgment area determining unit determines an aspect ratio of the first judgment area according to the front view direction, and wherein the judgment area determining unit determines an aspect ratio the second judgment area according to each of the predetermined directions.

With this structure, the aspect ratios of judgment areas can be appropriately adjusted in accordance with face directions, and the detect-ability factor can be improved in comparison with the conventional technology.

A sixth aspect of the present invention provides a face detection device as defined in the fifth aspect of the present invention, wherein the determined aspect ratio of the first judgment area is a smallest length-to-width aspect ratio in a group of the first judgment area and the second judgment area.

Rotation 3 (around side-to-side axis in the image plane): When a face direction is a front direction (frontal face image; the normal of the pseudo plane is parallel to the z-axis.) and a person bends/unbends his/her neck centering a joint of his/her head and his/her neck in the up-and-down direction, the aspect ratio of the frontal face image changes.

Rotation 4 (around side-to-side axis in the image plane): When a face direction is a left or right direction (profile face image; the normal of the pseudo plane intersects the z-axis.) and a person bends/unbends his/her neck to shake his/her face in the up-and-down direction, the aspect ratio of the profile (left or right) face image changes hardly at all. That is, the change range of the frontal face image is wider than the change range of the profile face image.

By adopting the above structure, it is enable to determine the change range of the frontal face image is wider than the change range of the profile face image, therefore, judgment precision and the detect-ability factor each concerning frontal face images can be improved. Moreover, the aspect ratio of the profile face image may be made smaller than that of the frontal face image, thereby the false positive rate can be reduced.

A seventh aspect of the present invention provides a face detection device as defined in the second aspect of the present invention, wherein the predetermined directions includes at least one of a left view direction and a right view direction.

An eighth aspect of the present invention provides a face detection device as defined in the second aspect of the present invention, wherein the front view direction is a direction toward which a face looks when both of two eyes on the face are included in the inputted image, and wherein each of the predetermined direction is a direction toward which a face looks when at least one of two eyes on the face is not included in the inputted image.

With these structures, face images including an image of only one of eyes, of which face-detection is very difficult with the conventional technology, can be handled.

A ninth aspect of the present invention provides a face detection device as defined in the first aspect of the present invention, wherein the judgment area determining unit determines the first judgment area and the second judgment area such that the first judgment area and the second judgment area can be raster-scanned to entirely cover the inputted image.

With this structure, one or more face images can be thoroughly detected, while reducing the false positive rate.

A tenth aspect of the present invention provides a face detection device as defined in the second aspect of the present invention, wherein the judgment area determining unit determines each of the sizes of the first judgment area and the second judgment area based on a size range of a face image to be extracted.

With this structure, the judgment area size is rationally reducible, and the face judgment unit searches only the areas to be searched at high speed, thereby detecting one or more face images.

An eleventh aspect of the present invention provides a face detection device as defined in the fourth aspect of the present invention, wherein the judgment area determining unit determines, according to an rotation range of a face image to be extracted, the first rotation range of the first judgment area with respect to the inputted image and the second rotation range for each of the second judgment area with respect to the inputted image.

With this structure, the rotation ranges is rationally reducible, and the face judgment unit searches only the ranges to be searched at high speed, thereby detecting one or more face images.

A twelfth aspect of the present invention provides a face detection device as defined in the sixth aspect of the present invention, wherein the judgment area determining unit determines each of aspect ratios of the first judgment area and the second judgment area, based on range of aspect ratios of rectangles enclosing face parts in a face image to be extracted.

With this structure, the change range of the aspect ratio enclosing the face parts is rationally reducible, and the face judgment unit searches only the ranges to be searched at high speed, thereby detecting one or more face images.

A thirteenth aspect of the present invention provides a face detection device as defined in the second aspect of the present invention, wherein the judgment area determining unit scales at least a part of the inputted image based on a size range of a face image to be extracted.

With this structure, the scaling range is rationally reducible, and the face judgment unit searches only the range to be searched at high speed, thereby detecting one or more face images.

A fourteenth aspect of the present invention provides a face detection device as defined in the fourth aspect of the present invention, wherein the judgment area determining unit turns at least a part of the inputted image based on an rotation range of a face image to be extracted.

With this structure, the rotation range of the inputted image is rationally reducible, and the face judgment unit searches only the ranges to be searched at high speed, thereby detecting one or more face images.

A fifteenth aspect of the present invention provides a face detection device as defined in the sixth aspect of the present invention, wherein the judgment area determining unit changes the aspect ratio of the inputted image based on an aspect ratio range of a face image to be extracted.

With this structure, the change range of the aspect ratio is rationally reducible, and the face judgment unit searches only the ranges to be searched at high speed, thereby detecting one or more face images.

A sixteenth aspect of the present invention provides a face detection device as defined in the tenth aspect of the present invention, wherein the judgment area determining unit selects a partial area of the inputted image as an area to be searched, and determines the partial area to cover all of the area to be searched.

A seventeenth aspect of the present invention provides a face detection device as defined in the seventh aspect of the present invention, wherein the face judgment unit utilizes a value obtained based on first and second pre-taught parameters and images within the first judgment area and the second judgment area, thereby judging if a face image of size greater than the predetermined size exists in either one of the first judgment area and the second judgment area, wherein the first pre-taught parameter has been obtained pre-teaching face images in the front view direction, thereby defining statistical distributions of the face images in the front view direction, and wherein each of the second pre-taught parameters has been obtained pre-teaching face images in each of the predetermined directions, thereby defining statistical distributions of the face images in each of the predetermined directions.

With these structures, frontal face images and profile face images can be detected simultaneously, while reducing false positive concerning the frontal face images.

An eighteenth aspect of the present invention provides a face detection device as defined in the sixteenth aspect of the present invention, further comprising: a person image selecting unit operable to select the inputted image when the face judgment unit judges that the inputted image is a person image; and a person image displaying unit operable to display the inputted image selected by the person image selecting unit.

A nineteenth aspect of the present invention provides a face detection device as defined in the sixteenth aspect of the present invention, further comprising: a person image selecting unit operable to select an image within the partial area when the face judgment unit judges that the image within the partial area is a person image; and a person image displaying unit operable to display the image within the partial area selected by the person image selecting unit.

A twentieth aspect of the present invention provides a face detection device as defined in the eighteenth aspect of the present invention, wherein the inputted image is one of images photographed by an amateur.

With these structures, only well-taken face images can be selected from a huge amount of AV contents to be recommended to a user.

This is especially effective in a case where the AV contents include images photographed by an amateur.

A twenty first aspect of present invention provides a face detection device as defined in the eighteenth aspect of the present invention, wherein the person image displaying unit cuts an image within an area that the face judgment unit judges to include one or more face images, thereby displaying the cut image.

With this structure, when only well-taken face images can be selected from a huge amount of AV contents to be displayed, the cut small images are used. Accordingly, as many cut face images as possible can be displayed in a limited screen.

A twenty second aspect of present invention provides a face detection device as defined in the eighteenth aspect of the present invention, wherein the person image displaying unit attaches a frame enclosing an image within an area that the face judgment unit judges to include one or more face images, thereby displaying the framed image.

With this structure, when only well-taken face images can be selected from a huge amount of AV contents to be displayed, the frame-attached face images are displayed. Accordingly, a user can easily understand what is a well-taken face image.

A twenty third aspect of present invention provides a mobile information terminal comprising: a face detection device, wherein the face detection device comprises: a judgment area determining unit operable to determine, in an inputted image, a first judgment area for judging existence of a face image in a front view direction and a second judgment area for judging existence of a face image, the face image to be judged in the second judgment area facing one of predetermined directions different from the front view direction; and a face judgment unit operable to judge existence of a face image in the first judgment area, the face image having a size greater than a first predetermined size, and to judge existence of a face image in the second judgment area, the face image having a size greater than a second predetermined size, as defined correspondingly to the second judgment area, wherein the judgment area determining unit determines a ratio of the first judgment area to the inputted image and a ratio of the second judgment area to the inputted image, according to respective directions of the front view direction and the predetermined directions.

Under the circumstances where operation means and/or interface means is limited such as a cell phone, a personal digital assistant or the like, this structure is effective to select only significant images from a huge amount of stored data.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5 illustrates an example of a table used by an operational parameter determining unit in the embodiment 1 of the present invention;

FIG. 6 (a) is an illustration showing the amount of information of a frontal face image in the embodiment 1 of the present invention;

FIG. 6 (b) an illustration showing the amount of information of a profile face image in the embodiment 1 of the present invention;

DETAILED DESCRIPTION OF THE PREFERRED EMBODIMENTS

Figure 1:
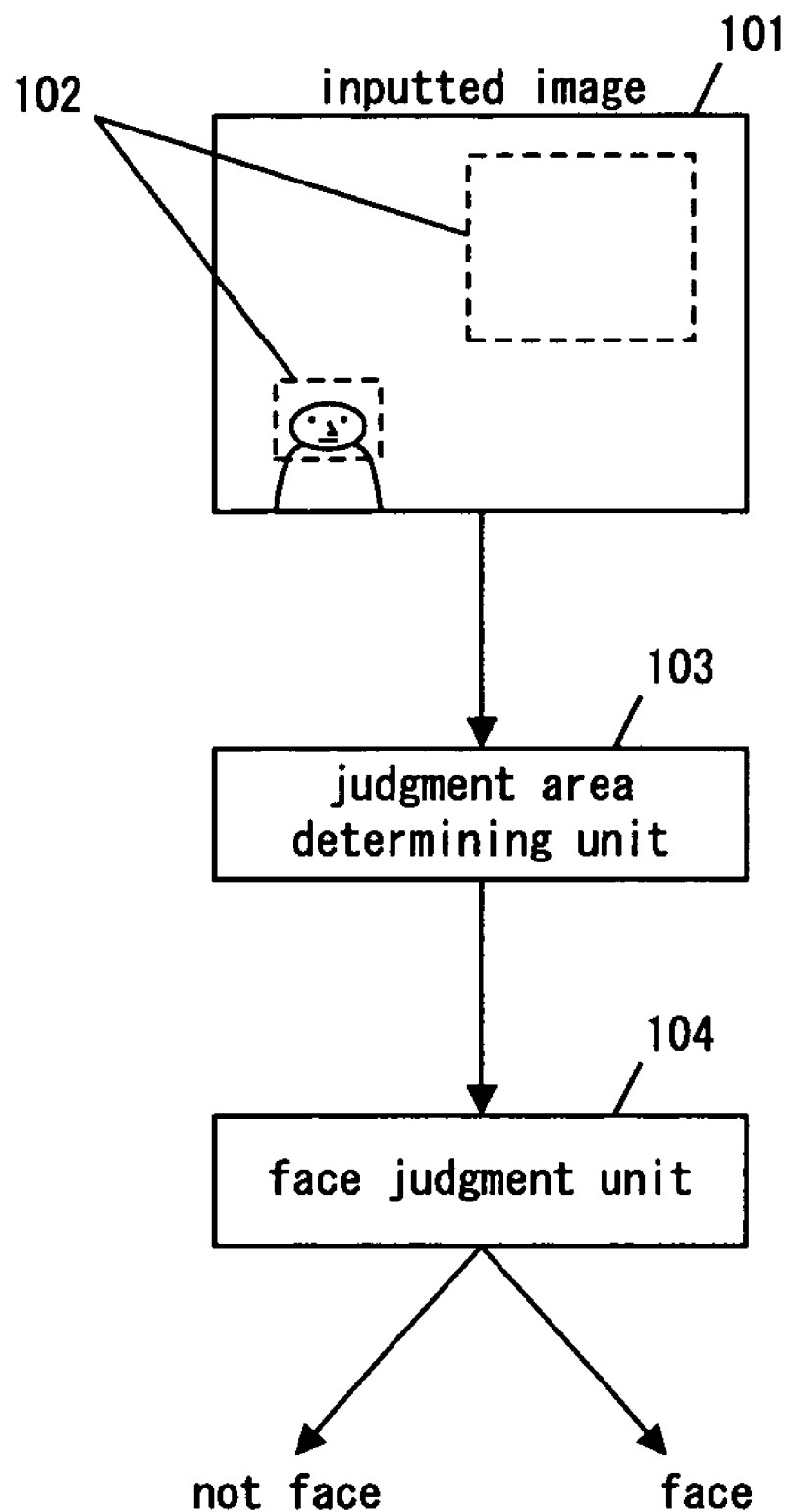
FIG. 1 is a functional block diagram of a face detection device in an embodiment 1 of the present invention.

Referring to the attached drawings, embodiments of the present invention will now be explained. First, in advance of concrete explanation of each embodiment, important terms are explained.

As mentioned above, in this specification, a face direction is a direction toward which a normal of a plane points when the plane is a pseudo plane composed of face parts such as eyes, a nose, and a mouth of a person. The direction of this normal is defined as the "direction" of a face.

When the person turns his/her face with his/her neck (v-axis), it is defined that the face direction has changed to the "left" or the "right." Concerning the "left" and the "right", a case where his/her face clearly looks toward the "left" or the "right" and a case where his/her face slightly looks toward the "left" or the "right" are not distinguished.

A case where his/her movement causes the face direction in an image to change and a case where movement of a camera, which photos him, causes the face direction in an image to change are not distinguished. In some cases, a mirror or the like may causes reflection of an image, thereby the face direction may change. However, causes of change of the face direction in an image make no difference. When the person nods, it is defined that the face direction has changed in the "up-and-down" direction.

When a face direction and a normal direction of an image are equal or almost equal, it is called that a face image looks toward the "front". Then, the face direction is in the "front view" direction concerning the "up-and-down" direction. The "left" direction is a direction when a face looks toward left, and the "right" direction is a direction when the face looks toward right. The "frontal face" is a face when a person looks toward front, and the "profile face" is a face when the face looks toward right or left.

Herein, the term of "almost equal" is not a mathematically strict term but a general term. There are some ambiguities regarding operation of a person in these definitions. The "front", "left" and "right" directions need not be strictly defined. It is sufficient that, a person who sees a face image can classify the face direction of the face image into one of the "front", "left" and "right" directions with some confidence.

The "size" of a face image is a variable defined in proportion to an area and/or a width of a face image in a digitized image. Needless to say, one or more faces in the image may look toward various directions.

When a face direction is "front", a face area is geometrically calculated referring to a positional relationship of face parts of eyes, a nose, and a mouth such that the face area encloses all of the face parts. Preferably, for example, the face direction may have the minimum rectangle size enclosing the eyes, the nose, and the mouth.

Herein, predetermined directions concerning a face image are the "left" direction or the "right" directions, which are profile directions. Each face detection device mentioned later may be constituted by one or more semiconductor integrated circuits, or the combination of software and an information processing apparatus that the software can run thereon.

Embodiment 1

FIG. 1 is a block diagram of a face detection device in an embodiment 1 of the present invention. In FIG. 1, a judgment area determining unit 103 determines an arbitrary area on an inputted image 101 as a judgment area 102, which is a rectangular window in this embodiment.

A face judgment unit 104, based on pixel information within the determined judgment area 102, judges whether or not the determined judgment area 102 is a face area to output a result thereof.

Figure 2A:
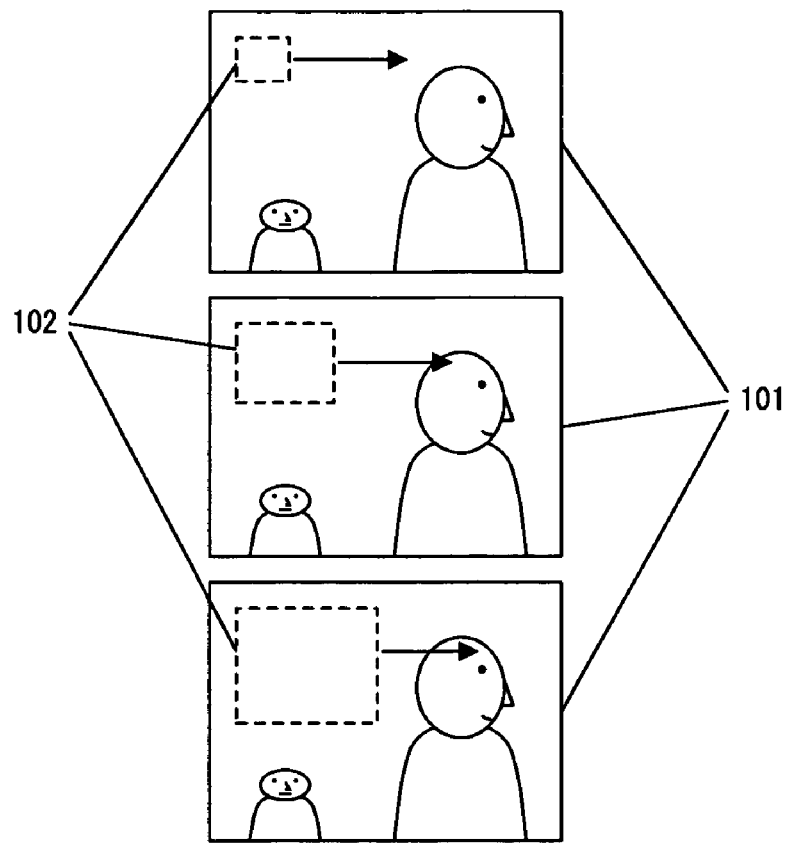
FIG. 2 (a) and FIG. 2 (b) are diagrams illustrating operation of a judgment area determining unit in the embodiment 1 of the present invention.
Figure 2B:
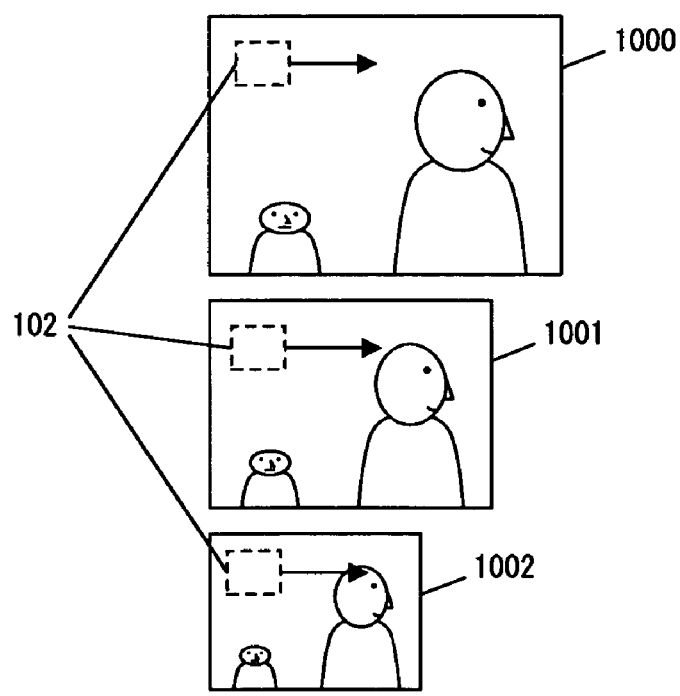

FIG. 2 (a) illustrates outline of operation of the judgment area determining unit 103. The judgment area determining unit 103 handles various sizes of face images, which are from a small face image to a big face image in the inputted image. Accordingly, the judgment area determining unit 103, while changing a used part of the inputted image 101 from a small size to a big size to be detected, makes the judgment area 102 raster-scan within the inputted image 101.

The judgment area determining unit 103 outputs image information within the determined judgment area 102 to the face judgment unit 104, which judges whether or not one or more face images exist within the determined judgment area 102.

In FIG. 2 (a), the judgment area determining unit 103 determines the judgment area 102 to make it raster-scan with in the inputted image while changing the size of the judgment are 102, thereby changing the ratio of the size of the judgment area 102 to the size of the inputted image 101. As shown in FIG. 2 (b), the judgment area determining unit 103, however, may fix the size of the judgment area 102 and scale (enlarge/reduce) the used part of inputted image 101, thereby changing the ratio of the size of the judgment area 102 to the size of the inputted image 101. In any case, each ratio is not distinguished but called as a scale ratio in this specification.

In this embodiment, the judgment area determining unit 103 makes the judgment area 102 raster-scan in order. The judgment area determining unit 103, however, may determine the position of the judgment area 102 randomly. For example, in pre-processing of face detection or the interior of the face detection device, the judgment area 102 to be judged may be limited in accordance with characteristic information such as edge information, flat information, and color information. The present invention includes a case where such limitation is performed.

In this embodiment, changing only the size of the judgment area 102 is explained, the judgment area determining unit 103, however, may make the judgment area 102 scan while changing a turn angle and/or an aspect ratio of the judgment area 102.

Figure 3:
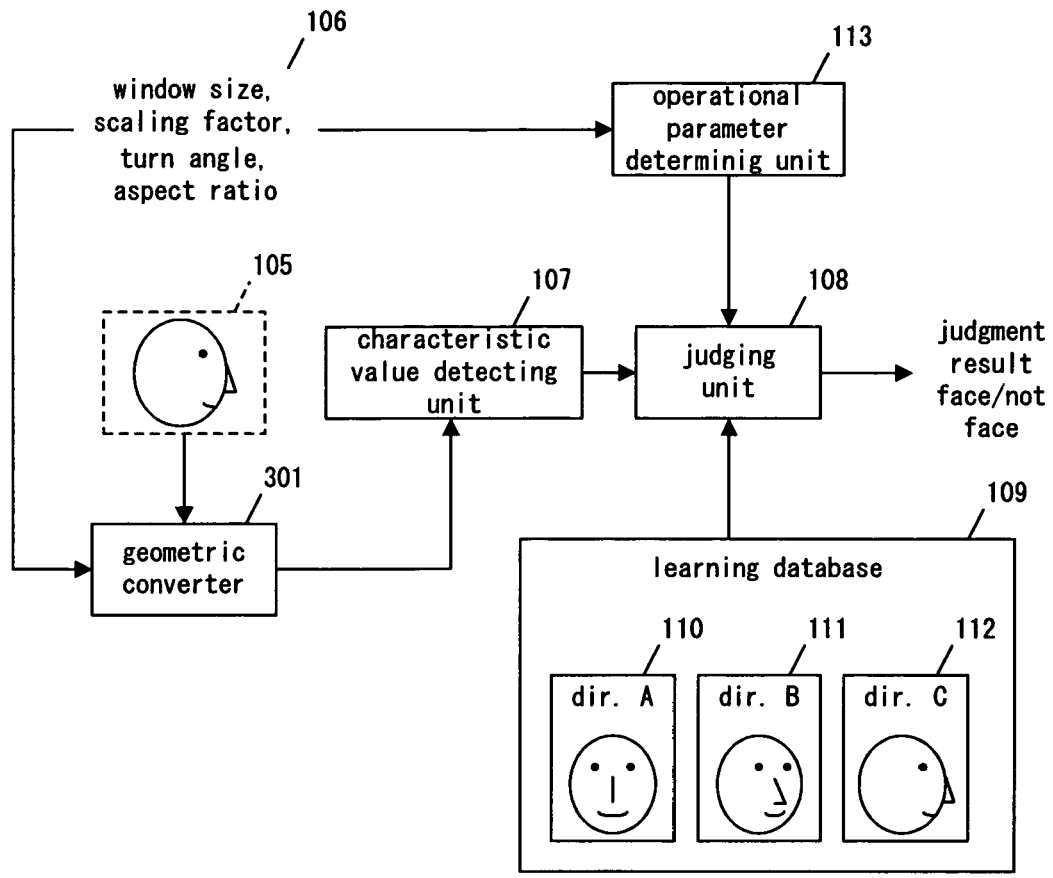
FIG. 3 is a functional block diagram of the face detection device in the embodiment 1 of the present invention.

Details of the turn angle and the aspect ratio will be explained later in embodiments 2 and 3. FIG. 3 is a block diagram of a face judgment unit in the embodiment 1 of the present invention. In FIG. 3, the judgment area determining unit 103 determines a used part image 105 within the judgment area in the inputted image 101.

A numerical value 106 is composed of a size of the judgment area 102, a scaling ratio for scaling (enlarging/reducing) the inputted image 101, a turn angle for turning the judgment area on the inputted image, and an aspect ratio of the judgment area.

A geometric converter 301, in accordance with the numerical value 106, performs geometric conversion (for example, affine transformation) to a used part of the inputted image, which exists on the judgment area, thereby generating an image whose size, turning angle and aspect ratio are the same as those of learning data.

A characteristic value detecting unit 107 detects from the used part image 105 within the judgment area a characteristic value utilized whether or not the used part image includes one or more face images. A judging unit 108 judges whether or not the used part image 105 includes one or more face images utilizing learning parameters stored in a learning database 109.

The learning database 109 stores parameters that have been generated by learning groups of face images in predefined directions. The parameters are used for identifying to which direction among the predefined directions the used part image relates. For example, a learning parameter 110 is a parameter for identifying a front face in 0 degree, which is the front view direction. A learning parameter 111 is a parameter for identifying a face in 30 degrees from the front view direction, and a learning parameter 112 is a parameter for identifying a face in 90 degrees from the front view direction.

Herein, the angle (e.g. 30 or 90 degrees; 0 degree: the front view direction) indicates that the face direction slants (left or right) to the direction of the angle. Which of left or right shall be made plus is arbitrary, however, has been defined beforehand. For example, if "left" is plus, then "right" is minus. In accordance with the size of the judgment area 102, an operational parameter determining unit 113 determines a parameter indicating which direction's parameter should be used.

Next, details of the face judgment unit 104 will now be explained. The characteristic value detecting unit 107 detects the characteristic value effective for identifying whether or not the used part image 105 within the judgment area 102 is a face image. This characteristic value is arbitrary, for example, brightness information obtained performing brightness histogram adjustment, an edge characteristic value, a HAAR wavelet characteristic value, another wavelet characteristic value, a characteristic value outputted from a rectangle filter, and so on.

The judging unit 108 identifies whether or not the used part image 105 within the judgment area 102 is a face image utilizing the learning database 109. The learning database 109 stores the results of having learned face images and non-face images according to the statistical learning theory.

The statistical learning theory is arbitrary, for example, a equalization method, a method using a neural network, a method using a probability model, a method using a support vector machine, a method based on ensemble learning, a method using boosting, and other methods according to various pattern recognition theory. This learning database 109, as mentioned above, stores learning parameters 110 to 112 for each face direction to be identified.

In addition, if face images in "−30" and "−90" degrees are not stored in the learning database 109, the judging unit 108 may generate mirror images of the face images in "30" and "90" degrees, and use the mirror images as the face images in "−30" and "−90" degrees. Range of learning parameters for the identifying may be predetermined, or may be defined by automatically clustering the face images when learning.

The learning database 109 may include parameters taught regarding upper and/or lower directions. Moreover, one or more sets of range may overlap. In short, it is sufficient that there are at least two kinds of learning parameter for identifying between face images in the front view direction and face images in profile directions different from the front view direction.

Figure 4:
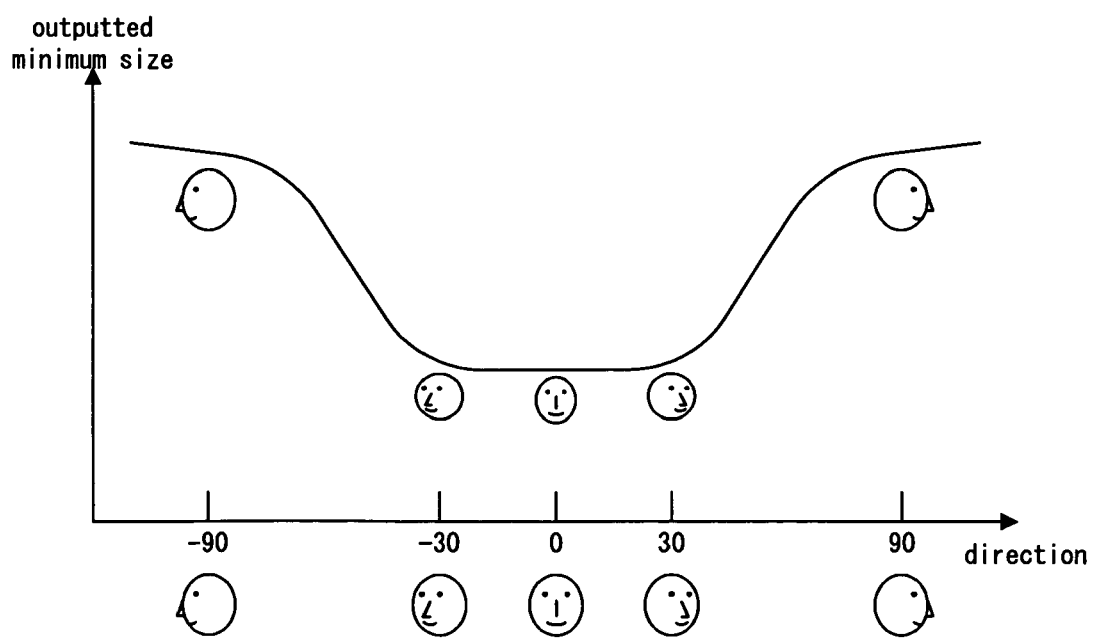
FIG. 4 is a graph showing properties of face judgment in the embodiment 1 of the present invention.

As shown in FIG. 4, preferably, outputted minimum size from the judging unit 108 is the smallest in the direction near to "0" degree, and gets greater when the direction goes toward "±90" degrees. Note that not a lower region below the curve of FIG. 4 but an upper region above the curve of FIG. 4 is used substantially. It is preferable not to store data concerning the lower region, because storage capacity, thereby, can be saved.

The following is the reason why it is preferable. First, detect-ability regarding profile faces is poorer than detect-ability regarding frontal faces.

As shown in FIGS. 6 (a) and (b), in an image within the judgment area 102, profile faces have less amount of characteristic information than frontal faces. When the judgment area 102 is composed of M×N pixels (Hereinafter, M and N are natural numbers.), with respect to frontal faces, as shown in FIG. 6 (a), an area S that well expresses face characteristic is almost all of the judgment area of the M×N pixels.

With respect to profile, there are many kinds of hairstyles, ears may appear out of hair or not. In many cases, only one eye of a person is included in the inputted image.

Accordingly, with respect to profile, as shown in FIG. 6 (b), an area S' (M'×N' pixels; M' and N' are natural numbers.) that well expresses face characteristic is just a part of the M×N pixels. In order to avoid misjudgment, it is preferable to determine the pixel numbers of M×N and M'×N' so that the areas S and S' have the almost same amount of information. In order to obtain detect-ability of profile faces as the almost same as that of frontal faces, as shown in FIG. 4, it is preferable to make the minimum outputted face size regarding profile faces greater than that of frontal faces consequently.

Secondly, in many cases, frontal faces are photographed in photographic images, which may be photographed by a digital camera, in relatively smaller size than profile faces experientially.

Person images can be roughly classified into two classes. One of the classes is a class of person images, souvenir photographs, and so on. In this case, persons of photographic subjects are aware of being photographed by a camera. The persons naturally look toward the camera, face images, therefore, become frontal face images in many cases. Many users take photographs using this photography method.

The other of the classes relates to a case where persons of photographic subjects are not aware of being photographed by a camera or a case where the persons pretend so. Professional cameramen often use this method to photo natural looks. Moreover, when photographing a movie by a movie camera, a result thereof is the almost same as the above in many cases.

In such a case, a cameraman watches and photos a specific person, the cameraman often adapts composition that the specific person (photographic subject) is photographed comparatively large. The photographic subject does not always look toward the camera, face images in various directions, therefore, are photographed as a result.

When such an image group is an object, it is, as mentioned above, preferable to make the minimum size of frontal faces smaller than the minimum size of profile faces. Making the face size the smallest in the directions near to the front view direction reduces misjudgment that judges non face images as face images, and prevents failing to judge face images (mainly, frontal faces).

The operational parameter determining unit 113 inputs the size of the judgment area 102, turn angle, or an aspect ratio, and sets up the operational parameter indicating which learning parameter should be used.

This embodiment 1 explains a case where size is used. Processing of the size of the judgment area 102 will now be described.

The operational parameter determining unit 113 comprises a table as shown in FIG. 5 to determine which learning parameter should be used in accordance with the size of the judgment area 102. The operational parameter determining unit 113, using this table, sets up the learning parameter to be used according to the size of the inputted judgment area 102.

The judging unit 108 determines the learning parameter to be used based on output of this table, and outputs a judgment result. In the example of FIG. 5, the learning parameter of the front view direction is determined to deal with the judgment area 102 whose size is smaller than those of the learning parameters in other directions. Thereby, a face image in the front view direction, which is smaller than face images in the profile directions, can be judged to be a face image.

In this embodiment, the operational parameter determining unit 113 determines the parameters such that the minimum face intentionally outputted by the operational parameter determining unit 113 is the smallest. The other parameters, however, may be used. For example, setting thresholds for the judging unit 108 to reduce misjudgment may be performed, thereby the operational parameter determining unit 113 consequently outputs the minimum face size in the front view direction, which is smaller than the minimum face size in the profile directions. In such cases, detecting efficiently images from a photographic image, while reducing misjudgment, can be realized as a result.

Figure 7:
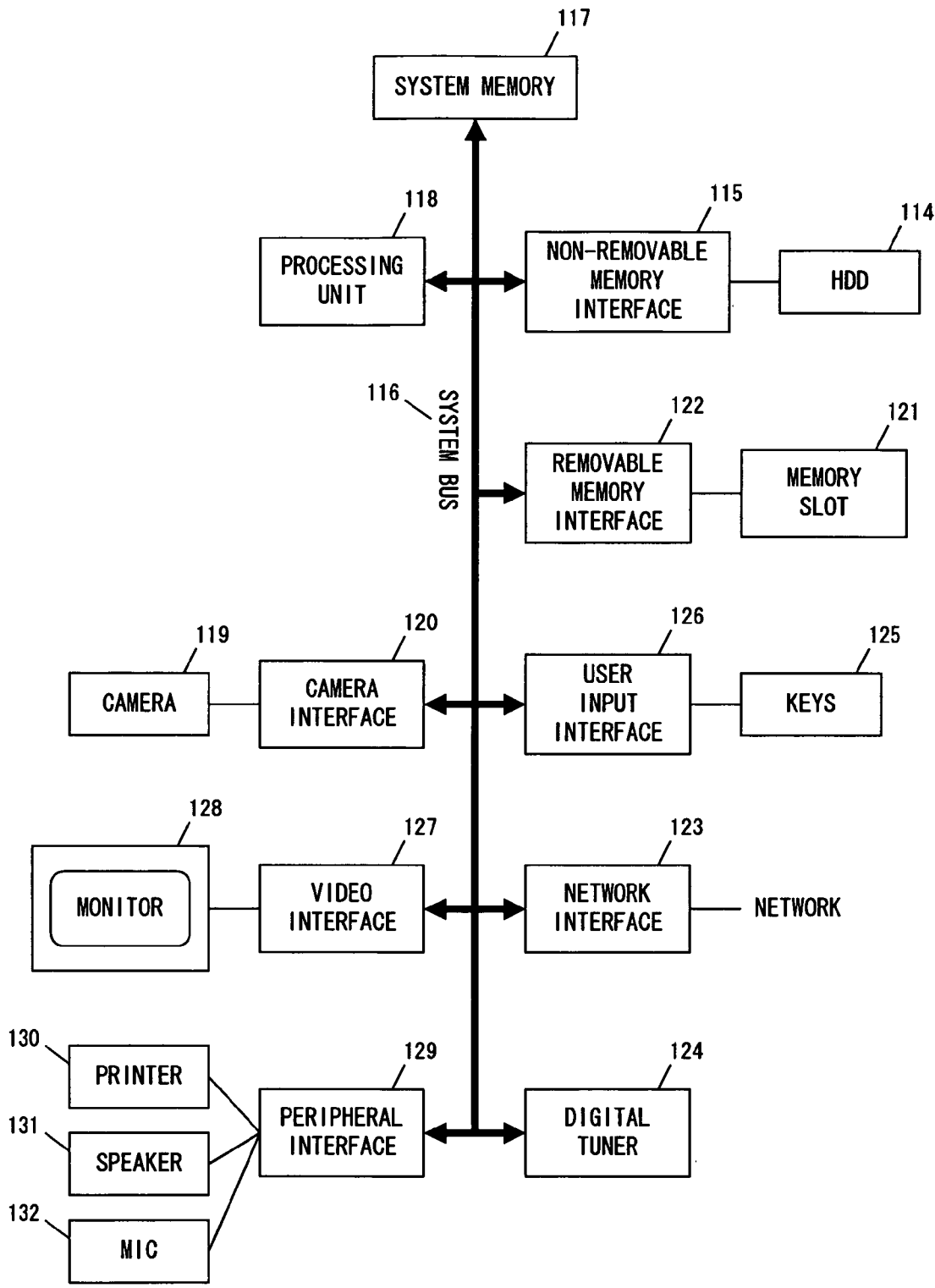
FIG. 7 is a block diagram of an electronic apparatus equipped with the face detection device in the embodiment 1 of the present invention.

FIG. 7 is a block diagram of electronic equipment implementing the face detection device in the embodiment 1 of the present invention. This composition is typically used in a computer, a cellular phone, a digital television, a recording device, and so on.

The software for realizing the face detection device of this embodiment is stored in a recording medium (hard disk drive) 114, and at the time of starting, this software 114 is loaded there-from to be stored in a system memory 117 passing through a system bus 116 and a non removable memory interface 115. And then, a process unit 118 runs this software, thereby the face detection device of this embodiment is realized.

The inputted image 101, which is a processing object, may be photographed by a camera 119 to be inputted via a camera interface 120. In other cases, the inputted image 101 may be included in movie or image information stored in a random access memory (RAM) inserted in a memory slot 121, and the inputted image 101 may be read from the random access memory to be inputted via a removable memory interface 122. Furthermore, the inputted image 101 may be inputted via a network interface 123 or a digital tuner 124. The inputted image 101 inputted from these devices is developed on the system memory 117, and then is used when the process unit 118 runs the above-mentioned software.

When a user, using keys 125, enters a command to require outputting a processing result, the command is sent to the process unit 118 via a user input interface 126, and the process unit 118 displays the processing result on a monitor 128 via a video interface 127 according to the command. Otherwise, the processing result is outputted to a printer 130 via a peripheral device interface 129. In some cases, a loudspeaker 131 and/or a microphone 132 may be used as a user interface.

The face judgment unit 104 in the embodiment 1 judges a frontal face smaller than the minimum profile face (in left or right directions) when the existence of one or face images should be judged. Accordingly, not only miss-detection is reduced but also face detection that matches characteristics of photographic images can be realized. Thereby, very efficient and reliable face detection can be performed.

Embodiment 2

In an embodiment 2, a judgment area determining unit 103 turns an inputted image in accordance with the range of rotation of face images to be detected, and then the judgment area determining unit 103 rotates a judgment area 102 according thereto. This embodiment enables face detection even when rotating a person's neck causes turning a frontal face on the z-axis, and/or when bending a person's neck back and forth causes turning a profile face on the z-axis.

Figure 13:
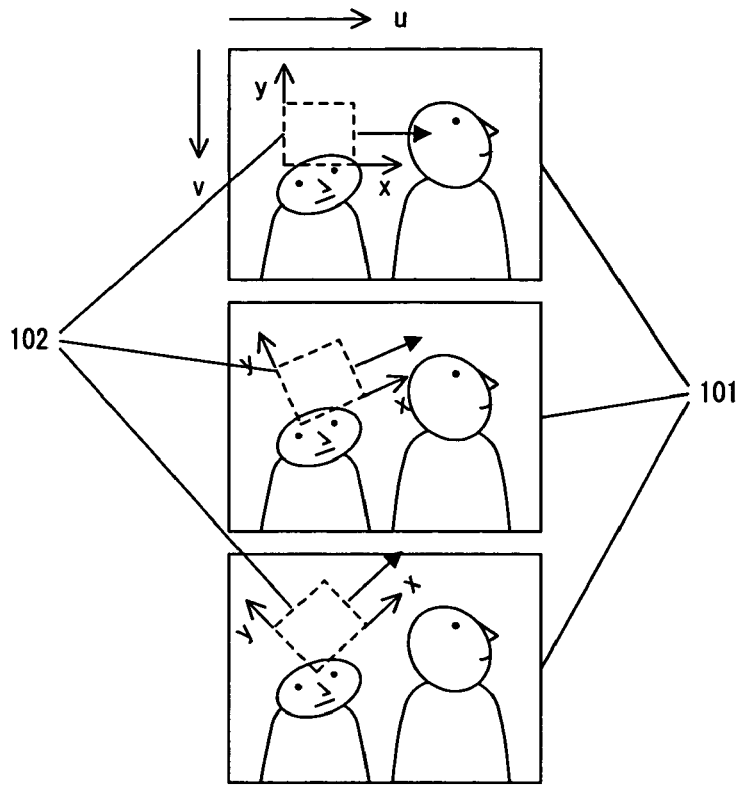
FIG. 13 illustrates operation of a judgment area determining unit in an embodiment 2 of the present invention.

FIG. 13 (a) shows the outline of operation of the judgment area determining unit 103 in this embodiment. The judgment area determining unit 103 deals with rotation of a frontal face in an image and movement of a profile face in the up-and-down direction.

These moving phenomena can be expressed as turns of a face image on the z-axis in an image. As described above, it is assumed as follows: z-axis is the optical-axis of a camera; u-axis is a horizontal axis of an image photographed by the camera, which is orthogonal to the z-axis; and v-axis is a vertical axis of the image, which is orthogonal to both of the z-axis and the u-axis.

Furthermore, as shown in FIG. 13, it is assumed as follows: x-axis is a horizontal axis of a judgment area 102 in an inputted image; and y-axis is a vertical axis of the judgment area 102. The turn angle of the judgment area 102 is an angle between the u-v system of coordinates and the x-y system of coordinates. The judgment area determining unit 103 in this embodiment turns a judgment area 102 in an inputted image within predetermined range, which is turn range of a face to be detected.

The judgment area determining unit 103 outputs image information within the turned judgment area 102 to the face judgment unit 104, and the face judgment unit 104 judges whether or not one or more face images exist in the turned judgment area 102.

In a case shown in FIG. 13 (a), the judgment area determining unit 103 changes the ratio of a turn angle of the judgment area 102 to a rotation angle of the inputted image 101, while changing the turn angle of the judgment area 102 gradually.

However, the size of the judgment area 102 may be fixed, the inputted image 101 may turn centering on the z-axis. As a result, the ratio of the turn angle of the judgment area 102 to the rotation angle of the inputted image 101 is changed. In this specification, the angles and the ratios in the above cases are not distinguished from each other. Similar to the embodiment 1, in this embodiment, the position of the judgment area to be judged may be determined randomly.

A geometric converter 301 turns the judgment area 102 such that the turned judgment area 102 has the same angle as that of the learning data in accordance with the determination of the judgment area determining unit 103.

Figure 14:
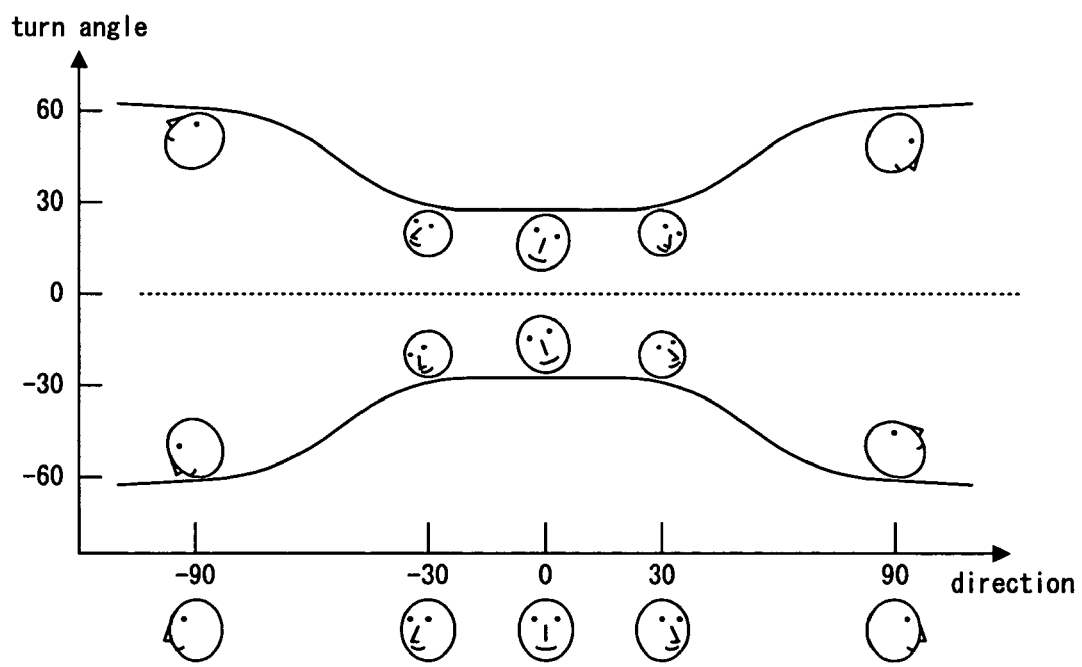
FIG. 14 is a graph showing properties of face judgment in the embodiment 2 of the present invention.

As shown in FIG. 14, it is preferable that turn range used by the judging unit 108 becomes the smallest at nearly "0" degree and becomes the greatest at "±90" degrees. The following is the reason why it is preferable. As shown in FIG. 14, the frontal face images obtained by turning the judgment area 102 and the profile face images obtained by turning the judgment area 102 differ from each other.

When a frontal face image turns on the z-axis, a person taken in the frontal face image rotates his/her face centering a joint of his/her head and neck right and left. When a profile face image turns on the z-axis, a person photographed in the profile face image bends/unbends his/her neck to shake his/her face in the up-and-down direction (for example, he/she is nodding.).

Generally, range where a person can shake his/her face in the up-and-down direction is wider than range where the person can rotate his/her face according to his/her frame structure, it is, therefore, preferable to determine the two kinds of range such that range concerning the profile face images is wider than range concerning the frontal face images. Due to this, changes of the profile face images in the up-and-down direction can be more precisely detected, thereby misjudgment of face images (mainly, profile face images) can be reduced.

An operational parameter determining unit 113 inputs size of the judgment area 102, turn angles, or aspect ratios to determine a learning parameter to be used as an operational parameter. In this embodiment, the operational parameter determining unit 113 determines a turn angle as the operational parameter.

Figures 15, 16:
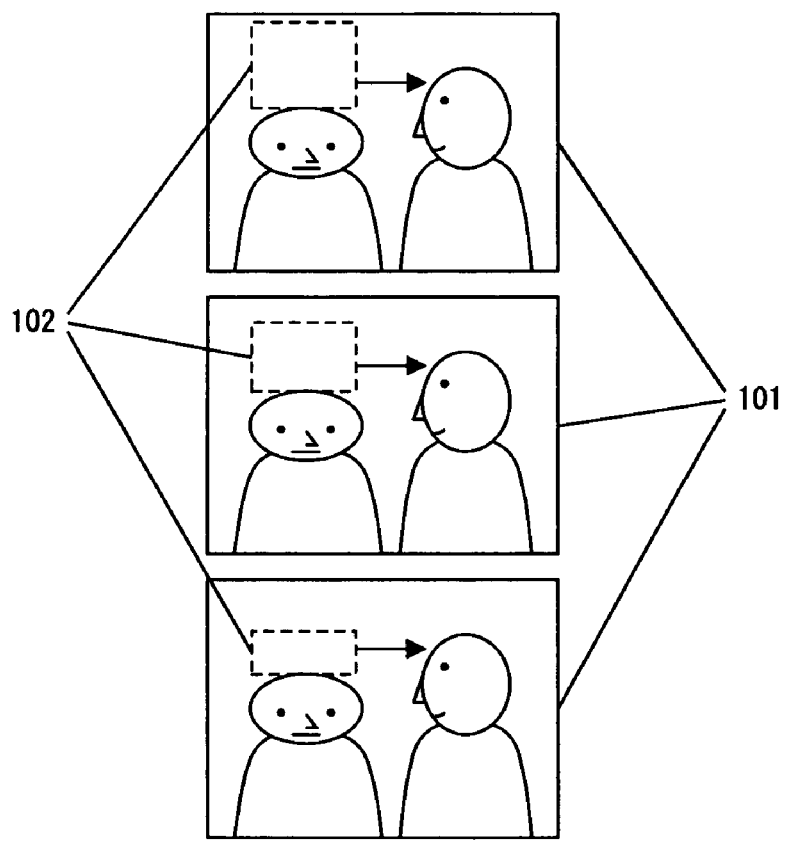
FIG. 15 illustrates an example of a table used by an operational parameter determining unit in the embodiment 2 of the present invention.
FIG. 16 illustrates operation of a judgment area determining unit in an embodiment 3 of the present invention.

Operating turn angles the judgment area 102 will now be explained. The operational parameter determining unit 113 possesses a table as shown in FIG. 15. The operational parameter determining unit 113, using this table, determines the learning parameter to be used according to the size of the inputted judgment area 102. The operational parameter determining unit 113 determines, based on the output of this table, the learning parameter to be used, and the judging unit 108 outputs a judgment result based on the determined learning parameter.

In the example of FIG. 15, the range of the learning parameters concerning the profile face images, which is from "−60" degree to "+60" degree, is wider than the range of learning parameters concerning the frontal face images, which is from "−30" degree to "+30" degree.

When judging the existence of one or more profile face images, judgment within wider range of turn angles than that of the frontal face images can be performed.

In this embodiment, the operational parameter determining unit 113 intentionally determines the parameters such that the minimum face size outputted there-from is the smallest. The other parameters, however, can be used. For example, in a case where a threshold is set up for the judging unit 108, it is preferable that the threshold is determined such that a detectability factor concerning profile face images is higher than that of frontal face images. Therefore, the judging unit 108 outputs, as objects to be detected, profile face images within wider range than that of frontal face images. In this case, accordingly, the detect-ability factor concerning the profile face images can be improved. The present invention also includes this case and the like.

The face judgment unit 104 in the embodiment 2 judges profile face images within wider range than that of frontal face images as face images, when the existence of one or face images should be judged. Accordingly, not only changes of the profile face images in the up-and-down direction can be widely detected but also face detection that matches characteristics of photographic images can be realized. Thereby, very efficient and reliable face detection can be performed.

Embodiment 3

In an embodiment 3, a judgment area determining unit 103 changes the aspect ratio of an inputted image 101 based on range of the aspect ratio of face images to be detected. Thereby, this embodiment enables to detect face images when frontal face images moves in the up-and-down direction and/or profile face images rotate.

FIG. 16 shows the outline of operation of the judgment area determining unit 103 in this embodiment. The judgment area determining unit 103 deals with movement of frontal face images in the up-and-down direction and/or rotation of profile face images.

In this embodiment, the movement and/or the rotation are/is expressed using the aspect ratio of a face. It is preferable that the learning data for face detection includes an item of an area that encloses images of face parts, such as eyes, a nose, and a mouth.

When a face moves from a front view position in the up-and-down direction, the aspect ratio of the area enclosing the face parts changes. To be more specific, the ratio of length of the area to width thereof becomes smaller.

The judgment area determining unit 103 changes the aspect ratio of the judgment area 102 within predetermined range, which is range of aspect ratios of faces to be detected, and outputs an image within the changed judgment area 102 to the face judgment unit 104. The face judgment unit 104 judges whether or not one or more face images exist in the changed judgment area 102.

As shown in FIG. 16, the judgment area determining unit 103 changes the aspect ratio of the judgment area 102 gradually. The aspect ratio of the judgment area 102, however, may be fixed and the aspect ratio of the inputted image 101 may be changed. In this specification, the ratios and changes thereof in the above cases are not distinguished from each other. Similar to the embodiment 1, in this embodiment, the judgment area determining unit 103 can determine the position of the judgment area 102 randomly.

According to the aspect ratio determined by the judgment area determining unit 103, the geometric converter 301 converts the image within the judgment area 102 into a converted image so that the converted image has the same aspect ratio as that of the learning data.

Figures 17, 18:
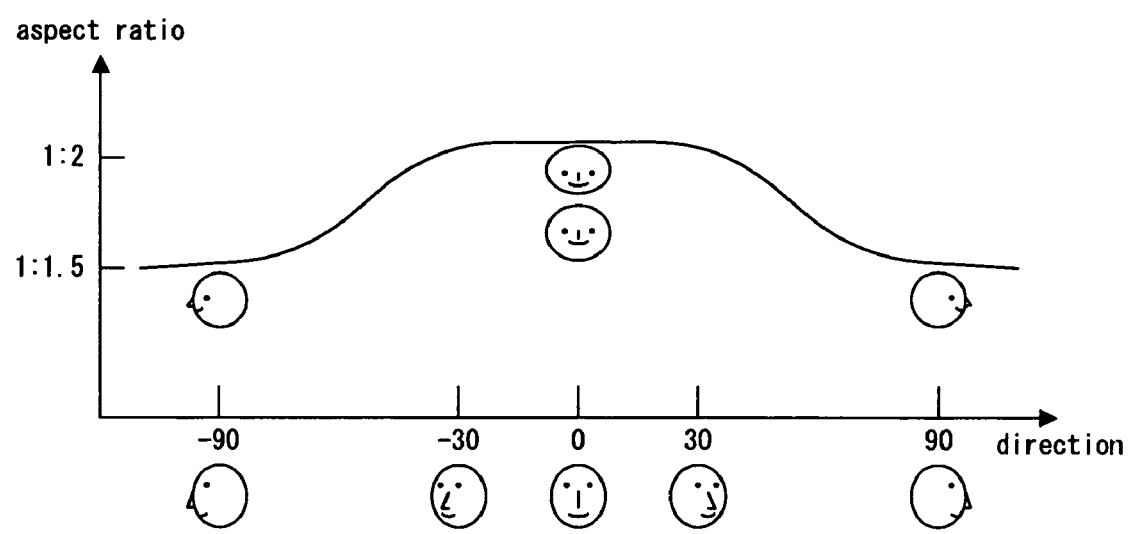
FIG. 17 is a graph showing properties of face judgment in the embodiment 3 of the present invention.
FIG. 18 illustrates an example of a table used by an operational parameter determining unit in the embodiment 3 of the present invention.

As shown in FIG. 17, it is preferable that the judging unit 108 determines the aspect ratios such that an aspect ratio in the front view direction ("0" degree) or neighborhood thereof is the greatest, the aspect ratios become smaller, and the aspect ratios in the profile direction ("±90" degrees) are the smallest.

The following is the reason why it is preferable. As shown in FIG. 17, the frontal face images obtained by changing the aspect ratio of the judgment area 102 and the profile face images obtained by changing the aspect ratio of the judgment area 102 differ from each other.

When a frontal face image changes the aspect ratio thereof, a person photographed therein bends/unbends his/her neck, thereby shaking his/her face in the up-and-down direction. When a profile face image changes the aspect ratio thereof, a person photographed therein rotates his/her face right and left.

According to human frame structure, change range where a person can shake his/her face in the up-and-down direction is wider than change range where he/she can rotate his/her face, it is, therefore, preferable that range of the aspect ratios concerning the profile face images is wider than range of the aspect ratios concerning the frontal face images. Due to this, changes of the frontal face images in the up-and-down direction can be more precisely detected, thereby misjudgment of face images (mainly, frontal face images) can be reduced.

The operational parameter determining unit 113 determines the aspect ratio of the judgment area 102 as an operational parameter. The operational parameter determining unit 113, using a table as shown in FIG. 18, determines the learning parameter to be used according to the size of the inputted judgment area 102. The operational parameter determining unit 113 determines, based on the output of this table, the learning parameter to be used, and the judging unit 108 outputs a judgment result based on the determined learning parameter.

In the example of FIG. 18, the range of the learning parameters concerning the frontal face images, which is from (1:1) to (1:1.25), is wider than the range of learning parameters concerning the profile face images, which is (1:1). When judging the existence of one or more frontal face images, judgment within wider range than that of the profile face images can be performed.

In this embodiment, the operational parameter determining unit 113 intentionally determines the parameters such that the minimum face size outputted there-from is the smallest. The other parameters, however, may be used. For example, setting thresholds for the judging unit 108 to reduce misjudgment may be performed, thereby consequently range of aspect ratios in the front view direction is wider range of aspect ratios in the profile directions. Since frontal face images are outputted in aspect ratio range wider than that of profile images, the detect-ability factor of profile face images can be improved.

The face judgment unit 104 judges frontal face images within wider range than that of profile face images as face images, when the existence of one or face images should be judged. Accordingly, face detection that matches characteristics of photographic images can be realized. Thereby, very efficient and reliable face detection can be performed.

Embodiment 4

Figure 8:
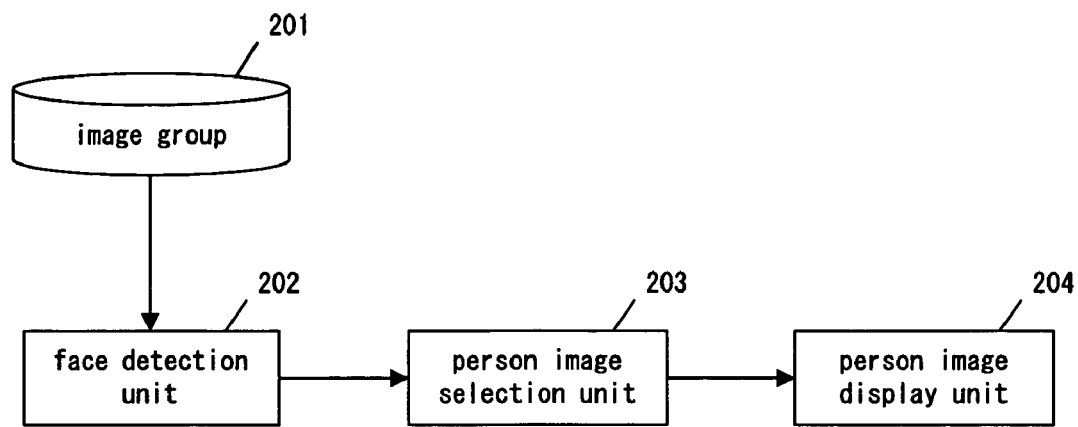
FIG. 8 is a functional block diagram of a face detection device in an embodiment 4 of the present invention.

In an embodiment 4, a person image selection unit 203 and a person image display unit 204 are added to the latter stage of the face detection device of the embodiments 1, 2 and 3. FIG. 8 is a block diagram of a face detection device in the embodiment 4 of the present invention. In FIG. 8, an image group 201 is an object of the face detection device in this embodiment.

The face detection unit 202 corresponds to the face detection device of the embodiment 1. The person image selection unit 203 selects an image based on output of the face detection unit 202. The person image display unit 204 displays the person image selected by the person image selection unit 203.

Flow of face detection in this embodiment will now be explained more. First, it is assumed that the image group 201 includes the target image group. The image group 201 is composed of still images and/or movies photographed by digital cameras, cell phones with digital cameras, movie cameras, and so on. Each of the movies can be accessed as a series of still images. Not only the still images but also each still image constituting the movies can be handled as an image.

There are many images photographed by amateurs in the image group 201. Typically, three kinds of images, which are landscape images, souvenir photographs, and images focusing a specific person, may exist in the image group 201.

A landscape image is an image that a cameraman has photographed landscape literally. In the landscape images, a person, if photographed unexpectedly, is not an intentional photographic subject.

Souvenir photographs are images that at least two persons have been photographed standing in a line or the like. Photographic subject thereof is all of the persons photographed. For example, when a main photographic subject is all of classmates, each of the classmates is photographed as a small size face image generally. To photo all of the classmates at once, each of the classmates tends to look toward the camera to be photographed in such a manner.

In images focusing a specific person, a main photographic subject is basically one, which is the specific person, and the specific person will be photographed in a camera focusing him/her in a certain angle. Then, in many cases, the specific person does not take care of the camera and be photographed to acquire natural looks. Moreover, when photographing a movie by a movie camera, a result thereof is the almost same as the above in many cases. In these cases, the specific person, who is the main photographic subject, is often focused in large face size in an image.

Figure 9:
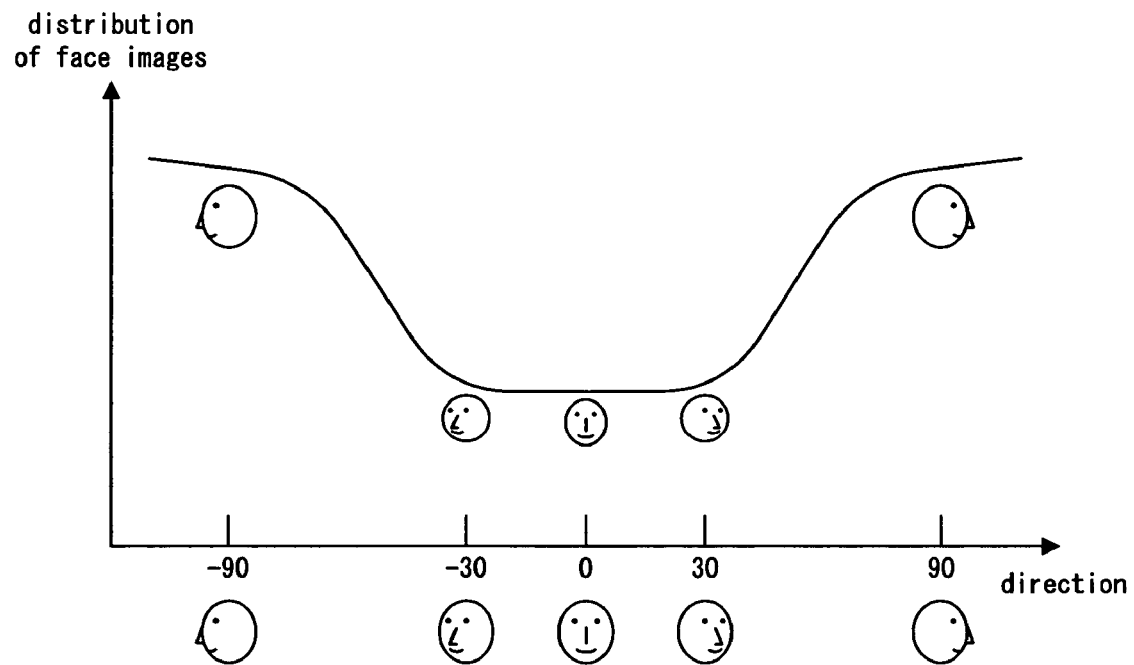
FIG. 9 is a graph showing properties of face judgment in the embodiment 4 of the present invention.

As described above, in the image group in which landscape images, souvenir photographs, and images focusing a specific person may exist, as shown in FIG. 9, the minimum face size tends to differ in accordance with face directions in the images. To be more specific, the minimum face size of profile face images tends to be greater than that of frontal face images. A face detection unit 202 detects face area from the image group 201 including landscape images, souvenir photographs, and images focusing a specific person.

As described in the embodiment 1, the minimum face size when detecting frontal face images is determined to be smaller than that of when detecting profile face images. This distribution earns output corresponding to the distribution of face images in the inputted image group 201. Consequently, efficient face detection matching the property of the target image group can be performed.

The person image selection unit 203, using the face area information detected by the face detection unit 202, selects images including one or more face areas as person images. Thereby, when a user wants to detect person images, one or more desired person images can be easily detected from the image group.

Figure 10:
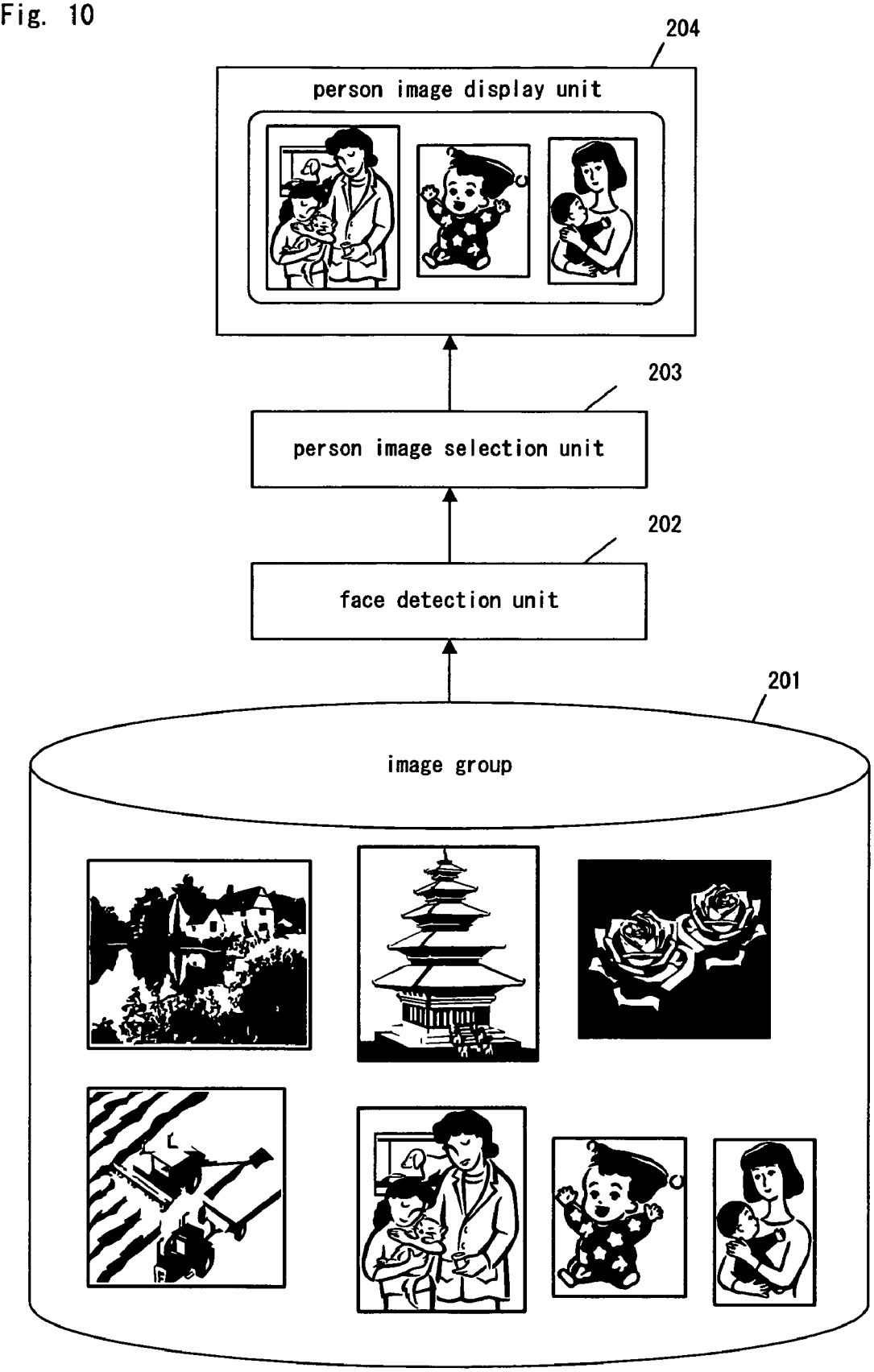
FIG. 10 is a functional block diagram of the face detection device in the embodiment 4 of the present invention.
Figure 11A:
FIG. 11 (a) to FIG. 11 (c) illustrate examples of displayed results in the embodiment 4 of the present invention.
Figure 11B:
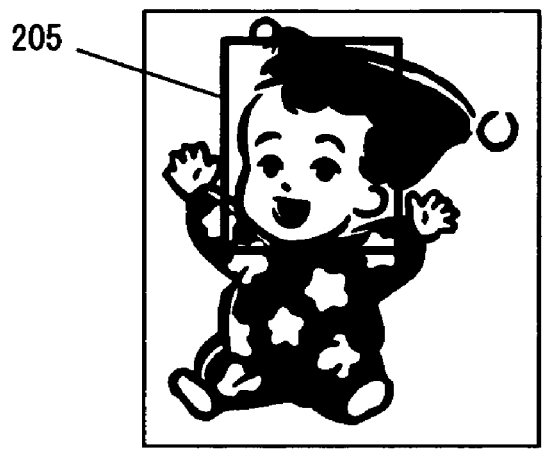
Figure 11C:
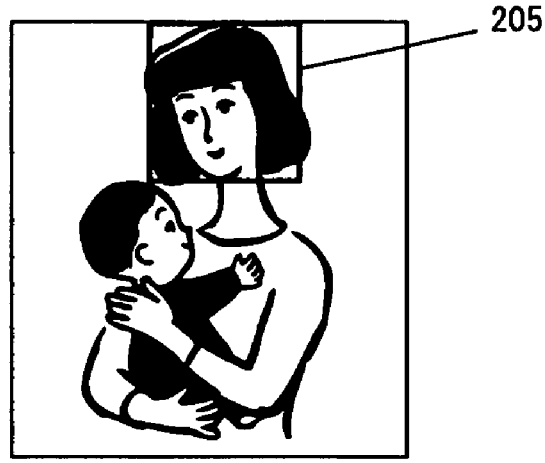

The person image display unit 204 displays thereon the person image selected from the image group. Then, as shown in FIG. 10, it is preferable that cutting an upper half of the body part off from the detected person image, inserting the cut part into a thumbnail, thereby displaying the thumbnail. Furthermore, as shown in FIG. 11, adding a frame 205 to a face area of the detected person image is also preferable.

The person image display unit 204 has a function for recommending an image suitable as a person image to a user in accordance with output value of the face detection unit. The "recommending" means "indicating an image that can show who has been photographed therein". In order to show who has been photographed, profile face images should have some size or more. This is because frontal face images have more amount of information indicating who has been photographed than the profile face images.

As described in the embodiment 1, the minimum face size when detecting frontal face images is smaller than that when detecting profile face images. Therefore, the image that can show who has been photographed therein can be selected and recommended effectively also for a communication partner of the user, who will receive from the user e-mail with the image.

There are various kinds of parameters indicating whether or not an image is well-taken, not only the size of a face area but also the degree of shadow, face disappearance, face directions, and so on. It is preferable to combine judgment results according to the various kinds of parameters, thereby evaluating whether or not the image is well-taken synthetically.

Otherwise, when the learning parameters obtained by learning of a group of well-taken images and another group of not well-taken images, the almost same results can be earned to recommend well-taken images.

The face judgment unit 104 in the embodiment 4 judges a frontal face smaller than the minimum profile face (in left or right directions) when the existence of one or face images should be judged. Accordingly, detection results correspond to the distribution of face images in the inputted image group, thereby efficient face detection matching the property of the target image group can be performed. Furthermore, the image that can show who has been photographed therein can be detected to be recommended as a well-taken image.

Embodiment 5

Figure 12:
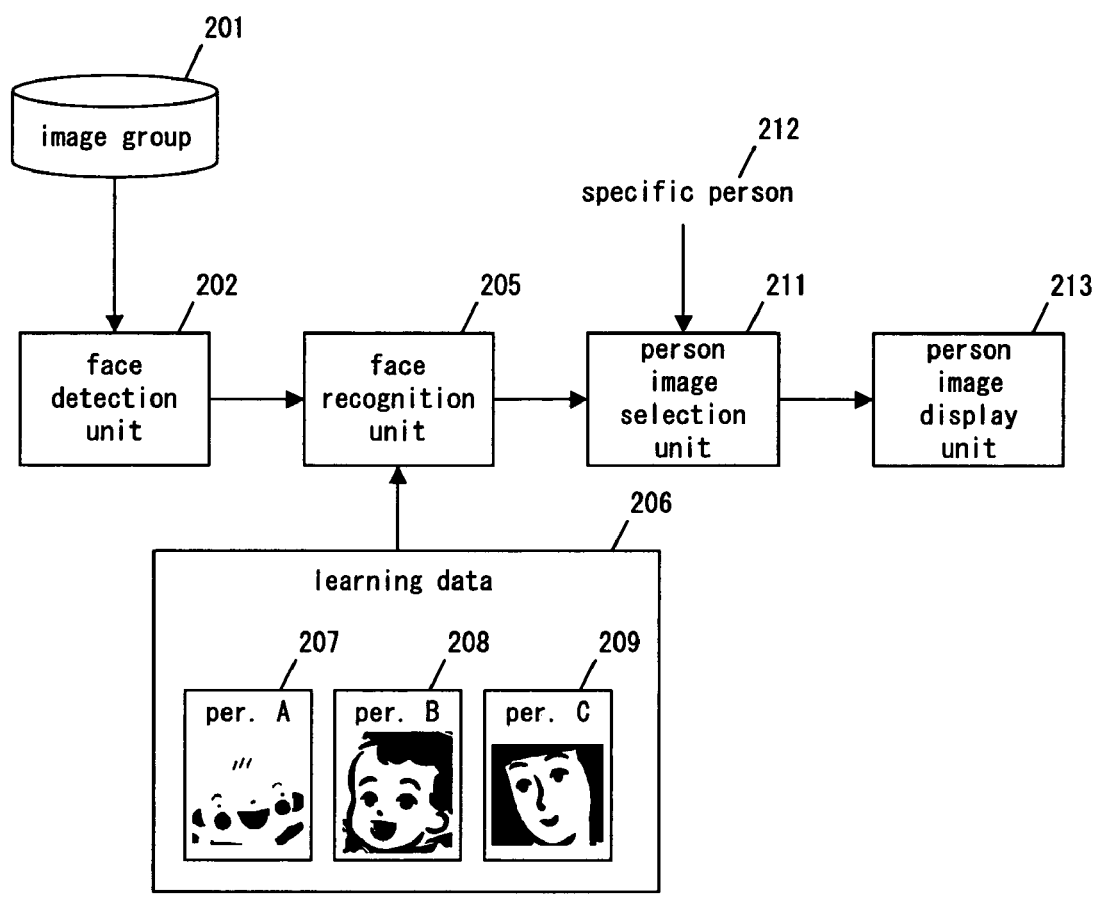
FIG. 12 is a functional block diagram of a face detection device in an embodiment 5 of the present invention.

In an embodiment 5, a face recognition unit, which recognizes whether or not a person included in a detected face image relates to a specific person, is added to the latter part of the face detection unit of the embodiment 4. FIG. 12 is a block diagram of the embodiment 5 of the present invention. In FIG. 12, duplicated explanation is omitted by attaching the same symbols to the same elements as those in the embodiments 1 and 2.

The face recognition unit 206 identifies whether or not an image in a face area includes a specific person's image in accordance with information on a person identification database 206 on which identification parameters for identifying a specific person have been registered.

The person identification database 206 stores identification parameters 208, 209 and 210 for persons A, B and C, respectively. These parameters 207 to 209, for example, are used to identify face images of a user himself/herself, and his/her family. The person image selection unit 211 selects images to be selected using key information (for example, information specifying a specific person 212). The person image display unit 213 displays a group of images selected by the person image selection unit 211, and recommends one or more specific images of the group to a user as candidates.

Details of face detection processes in this embodiment will now be explained. The image group 201 and the face detection unit 202 are the same as those of the embodiment 4, and the face detection unit 202 detects one or more face areas from the image group 201.

The face recognition unit 205 identifies who, among persons registered in the identification database 206, relates to a face area in accordance with the information of the person identification database 207. A method disclosed in Japanese Patent No. 3468108 may be used as the concrete identifying method for the above.

In order to identify the persons A, B, and C, respectively, information for evaluating individual difference is required. In this embodiment, it is assumed that the value of the information for evaluating individual difference is proportional to the area of a rectangle portion, which encloses the outlines of eyebrows, eyes, a nose, and a mouth in a frontal face image, characterizing individual difference.

As the area of rectangle portion becomes smaller, identifying the individual difference becomes harder, and then misjudgment may occur as a result. Under the same conditions, a frontal face has the area of the rectangle portion greater than that of a profile face. This is because one of eyebrows and one of eyes often hide behind in the profile face.

When a profile face image has the same area as a frontal face image, the effective area of the profile image is so small that cases where miss-identification occurs increase.

It is important to make the minimum face size when detecting front faces smaller than the minimum face size when detecting profile faces. Thereby, the face recognition unit 205 inputs the information for evaluating individual difference with the property that hardly causes miss-identification at all. Consequently, efficient face detection matching the property of a target image group can be performed.

The person image selection unit 211, using information of one or more face areas recognized by the face recognition unit 205, selects an image including one or more face areas as a specific person image. Thereby, a user can extract an image including the specific person image from the image group.

The person image display unit 213 displays thereon the person image selected from the image group. Then, as shown in FIG. 10, it is preferable that cutting an upper half of the body part off from the detected person image, inserting the cut part into a thumbnail, thereby displaying the thumbnail. Furthermore, as shown in FIG. 11, adding a frame 205 to a face area of the detected person image is also preferable.

In the embodiment 5, a specific person is used as a key. The person image display unit 213 of the embodiment 5 uses the specific person as a key, and displays an image that can show the specific person has been photographed therein.

The person image display unit 213 displays the group of images selected by the person image selection unit 211, and recommends one or more specific person images, which are well-taken, of the group to the user as candidates.

The user may chooses a favorite image out of the specific person images, attach and transmits it to e-mail as a representation image, and carry out various processing, such as creating a character like the specific person.

This embodiment matches to the fact that frontal face images have great amount of information indicating face characteristics and are easy to be judged as face images than profile face images. As a result, efficient face detection can be performed.

In photography using a digital camera, the tendency is different between when two or more persons are photographed simultaneously and when only one person is photographed. When two or more persons are photographed simultaneously, a small frontal face images exist in the photographed image. When only one person is photographed, not only a snapshot of the one person, which is a frontal face image but also a profile face image in one of various directions may exist in the photographed image.

With respect to well-taken images, it is one of the criterions of judgment whether an image can show who has been photographed therein or not. A profile face image should have considerably large size to show who has been photographed therein. Constituting a face detection device extremely matching such tendency enables to recommend one or more well-taken face images to a user.

According to the present invention, the property of face images can be effectively utilized, one or more well-taken face images, therefore, can be adequately extracted from a huge amount of stored AV contents, while reducing false positive concerning profile face images.

Having described preferred embodiments of the invention with reference to the accompanying drawings, it is to be understood that the invention is not limited to those precise embodiments, and that various changes and modifications may be effected therein by one skilled in the art without departing from the scope of the invention as defined in the appended claims.

What is claimed is:

1. A face image detection device, comprising:
   a face detection unit operable to extract face images from a plurality of stored images;
   a judgment area determining unit operable to, for each of the face images, (i) determine a judgment area for judging whether or not a particular face image among the face images is in a front view direction or a side view direction within a plurality of predetermined view directions other than the front view direction, and (ii) determine a view direction for the particular face image among the face images, respectively; and
   a face judgment unit operable to judge, for each of the face images, whether or not the particular face image among the face images has a size greater than a predetermined threshold size in the judgment area, so that when the particular face image has a size greater than the predetermined threshold size, according to a respective view direction, the particular face image is accurately analyzed,
   wherein said judgment area determining unit determines a ratio of a size of the judgment area to a size of a stored image for each of the plurality of stored images according to the respective view direction of the particular face image extracted from the stored image, and
   the predetermined threshold size is different according to the respective view direction of the particular face image.

2. A face detection device as claimed in claim 1, wherein a judgment area determined by the judgment area determining unit with respect to the front view direction is not greater than a judgment area determined with respect to the side view direction from the plurality of predetermined view directions other than the front view direction.

3. A face detection device as claimed in claim 2, wherein the plurality of predetermined view directions include at least one of a left view direction and a right view direction.

4. A face detection device as claimed in claim 3, wherein said face judgment unit utilizes a value, based on a first pre-taught parameter, second pre-taught parameters, and images within the judgment area, to judge if the particular face image having a size greater than the predetermined threshold size exists in the judgment area, wherein
   the first pre-taught parameter is obtained by pre-teaching face images in the front view direction, to define statistical distributions of the face images in the front view direction, and
   the second pre-taught parameters are obtained by pre-teaching face images in the plurality of predetermined view directions, to define statistical distributions of the face images in the plurality of predetermined view directions.

5. A face detection device as claimed in claim 2, wherein the front view direction is a direction toward which a face looks when both of two eyes on the face are included in the particular face image, and
   the side view direction within the plurality of predetermined view directions is a direction toward which a face looks when at least one of two eyes on the face is not included in the particular face image.

6. A face detection device as claimed in claim 2, wherein said judgment area determining unit determines a size of the judgment area based on a size range of the face images to be extracted from the plurality of stored images.

7. A face detection device as claimed in claim 6, wherein said judgment area determining unit selects a partial area of the plurality of stored images as an area to be searched and determines the partial area to cover all of the area to be searched.

8. A face detection device as claimed in claim 7, further comprising:
   a person image selecting unit operable to select an image from the plurality of stored images when said face judgment unit judges that the image is a person image; and
   a person image displaying unit operable to display the person image selected by said person image selecting unit.

9. A face detection device as claimed in claim 8, wherein the plurality of stored images are images photographed by an amateur.

10. A face detection device as claimed in claim 8, wherein said person image displaying unit cuts an image within an area that said face judgment unit judges to include one or more face images and displays a cut portion of the image.

11. A face detection device as claimed in claim 8, wherein said person image displaying unit attaches a frame enclosing an image within an area that said face judgment unit judges to include one or more face images and displays a framed image.

12. A face detection device as claimed in claim 7, further comprising:
- a person image selecting unit operable to select an image within the partial area when said face judgment unit judges that the image within the partial area is a person image; and
- a person image displaying unit operable to display the image within the partial area selected by said person image selecting unit.

13. A face detection device as claimed in claim 1, wherein said judgment area determining unit changes a difference between a rotation of each of the plurality of stored images and a rotation of the judgment area within a predetermined rotation range, in accordance with the respective view direction among the plurality of predetermined view directions.

14. A face detection device as claimed in claim 13, wherein the predetermined rotation range with respect to the front view direction is not greater than the predetermined rotation range with respect to the side view direction.

15. A face detection device as claimed in claim 14, wherein said judgment area determining unit determines the rotation of the judgment area based on a rotation range of the face images to be extracted from the plurality of stored images.

16. A face detection device as claimed in claim 14, wherein said judgment area determining unit turns at least a part of the plurality of stored images based on a rotation range of the face images to be extracted.

17. A face detection device as claimed in claim 1, wherein said judgment area determining unit determines an aspect ratio of the judgment area, for each of the face images, in accordance with the respective view direction of the particular face image among the face images among the plurality of predetermined view directions.

18. A face detection device as claimed in claim 17, wherein the aspect ratio, determined by the judgment area determining unit, with respect to the front view direction is not greater than the aspect ratio, determined by the judgment area determining unit, with respect to the side view direction within the plurality of predetermined view directions.

19. A face detection device as claimed in claim 18, wherein said judgment area determining unit determines the aspect ratio of the judgment area based on a range of aspect ratios of rectangles enclosing face parts in the face images to be extracted from the plurality of stored images.

20. A face detection device as claimed in claim 18, wherein said judgment area determining unit scales at least a part of the plurality of stored images based on a size range of the face images to be extracted.

21. A face detection device as claimed in claim 18, wherein said judgment area determining unit changes an aspect ratio of the plurality of stored images based on an aspect ratio range of the face images to be extracted.

22. A face detection device as claimed in claim 1, wherein said judgment area determining unit determines the judgment area such that the judgment area entirely covers the particular face image.

23. A mobile information terminal comprising:
- a face detection device,
- wherein said face detection device comprises:
- a face detection unit operable to extract face images from a plurality of stored images;
- a judgment area determining unit operable to, for each of the face images, (i) determine a judgment area, for each of the face images, for judging whether or not a particular face image among the face images is in a front view direction or a side view direction within a plurality of predetermined view directions other than the front view direction, and (ii) determine a view direction for the particular face image among the face images, respectively; and
- a face judgment unit operable to judge, for each of the face images, whether or not the particular face image among the face images has a size greater than a predetermined threshold size in the judgment area, so that when the particular face image has a size greater than a predetermined threshold size, according to a respective view direction, the particular face image is accurately analyzed,
- wherein said judgment area determining unit determines a ratio of a size of the judgment area to a size of a stored image for each of the plurality of stored images according to the respective view direction of the particular face image extracted from the stored image, and
- the predetermined threshold size is different according to the respective view direction of the particular face image.

24. A semiconductor integrated circuit comprising:
- a face detection unit operable to extract face images from a plurality of stored images;
- a judgment area determining unit operable to, for each of the face images, (i) determine a judgment area for judging whether or not a particular face image among the face images is in a front view direction or a side view direction within a plurality of predetermined view directions other than the front view direction, and (ii) determine a view direction for the particular face image among the face images, respectively; and
- a face judgment unit operable to judge, for each of the face images, whether or not the particular face image among the face images has a size greater than a predetermined threshold size in the judgment area, so that when the particular face image has a size greater than the predetermined threshold size, according to a respective view direction, the particular face image is accurately analyzed,
- wherein said judgment area determining unit determines a ratio of a size of the judgment area to a size of a stored image for each of the plurality of stored images according to the respective view direction of the particular face image extracted from the stored image, and
- the predetermined threshold size is different according to the respective view direction of the particular face image.

25. A semiconductor integrated circuit as claimed in claim 24, wherein said judgment area determining unit changes a difference between a rotation of the plurality of stored images and a rotation of the judgment area within a predetermined rotation range in accordance with the respective view direction of the particular face image among the plurality of predetermined view directions.

26. A semiconductor integrated circuit as claimed in claim 24, wherein said judgment area determining unit determines an aspect ratio of the judgment area, for each of the face images, in accordance with the respective view direction of the particular face image among the face images among the plurality of predetermined view directions.

* * * * *